UNITED STATES PATENT OFFICE.

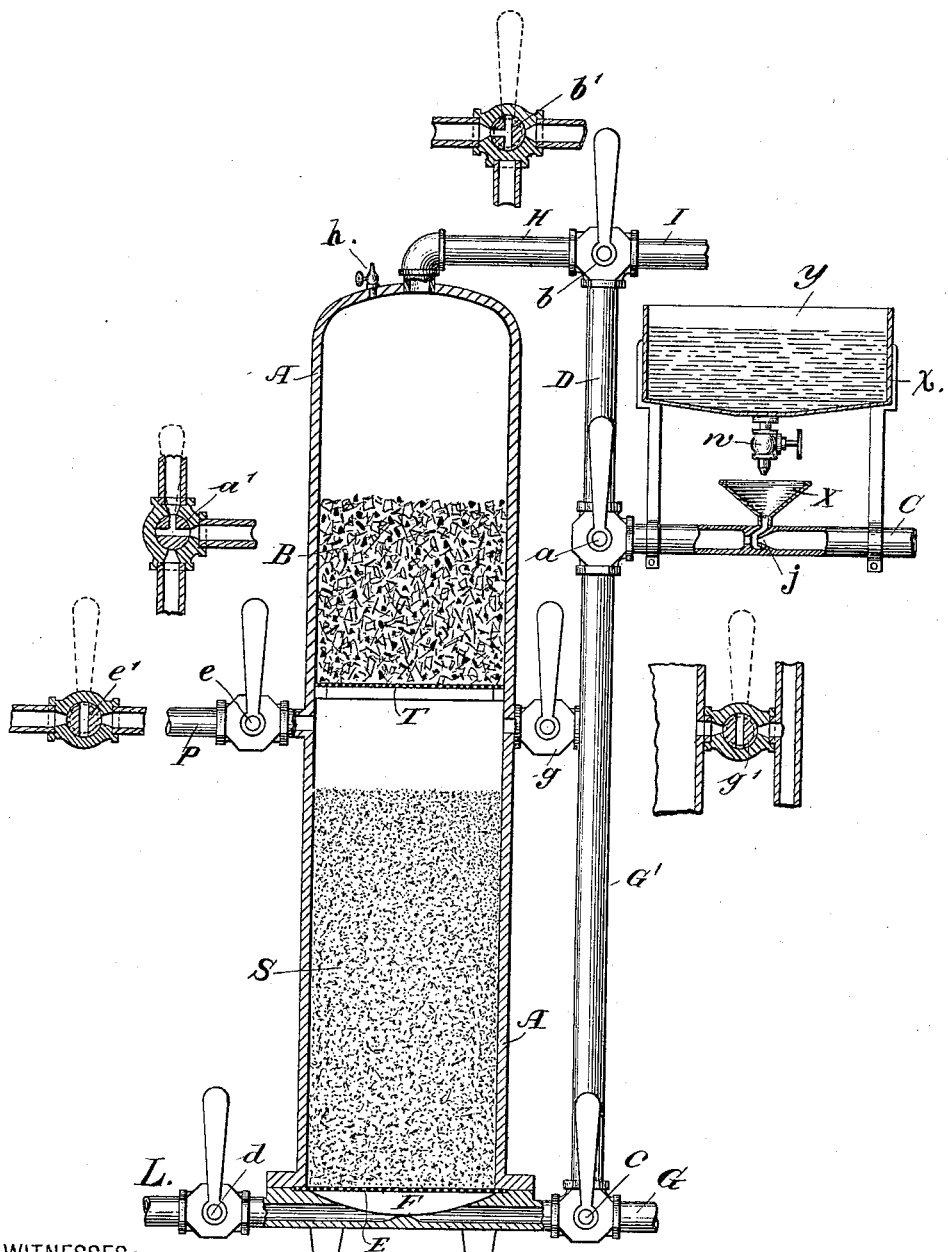

ROBERT E. MILLIGAN, OF NEW YORK, N. Y., ASSIGNOR TO HENRY B. ANDERSON, OF SAME PLACE.

ART OF PURIFYING LIQUIDS.

SPECIFICATION forming part of Letters Patent No. 614,617, dated November 22, 1898.

Application filed January 22, 1898. Serial No. 667,614. (No specimens.)

*To all whom it may concern:*

Be it known that I, ROBERT E. MILLIGAN, a citizen of the United States, residing in the city, county, and State of New York, have invented new and useful Improvements in the Art of Purifying Liquids, of which the following is a specification.

The invention relates to the art of purifying water and liquids of which water is the principal constituent; and it consists in arrestation and removal of undesirable matter or impurities contained therein by the use of means or apparatus which dispenses with the necessity of introducing chemical coagulants into the water prior to filtration or subsidence or the employment of electricity generated from a source exterior to the liquid to be purified.

My invention is based upon the discovery that water needing purification generally constitutes an electrolyte when in contact with hard carbon and a metal which is electropositive to carbon or when in contact with two substances which are relatively electropositive and electronegative to each other, and by the use of which filtration can be effected.

An apparatus suitable for the purposes of my invention is shown in the accompanying drawing.

I have discovered that there are some waters which do not possess the constituents to enable them to form an efficient electrolyte by themselves, and it is necessary, therefore, to transform the water into an electrolyte.

I have discovered that in the case of such waters as just above described the process can be made much more effective by introducing into the water prior to its entrance into the filter or filtering apparatus a substance which will convert the water into an effective electrolyte. I have used with beneficial results a dilute solution in water of sulfuric acid, (commercially known as "oil of vitriol,") and I have found that a solution of two ounces of sulfuric acid in a gallon and a half of water, when introduced into the water to be filtered, gave the water of the Croton river the necessary properties. I have found that this solution of sulfuric acid could be effectively introduced into an intake-pipe, delivering ten gallons per minute, introducing the solution at the rate of one drop per second of time or sixty drops per minute. The addition of this solution in the manner described to the Croton water which was filtered through the apparatus gives better results than when the solution was not introduced into the water.

Referring to the accompanying drawing, which exhibits a part perspective and a part sectional view of an apparatus with which my invention may be suitably employed, I have shown a filter-chamber A, which is divided by the screen T into an upper and a lower chamber. The upper chamber is partially filled with a mixture of granulated hard carbon and flakes of aluminium or other metal electropositive to carbon. The lower chamber contains a filtering-bed of sand S or equivalent granular filtering material.

C, D, H, G, P, I, and L are suitable connecting-pipes for the supply of water to be filtered and its outlet, the outlets for the washing-water, and the inlet for air during the operation of washing.

$x$ is a tank mounted upon the pipe C and designed to hold the solution $y$, of sulfuric or other acid. This tank $x$ has an outlet-valve $w$, by means of which the quantity of solution to be injected into the water to be filtered is regulated. There is a valve $h$ placed in the top of the upper half of the filter-chamber A, which is intended to permit the escape of air which will find its way into this portion of the filter-chamber with the entering water to be filtered. This valve may be operated by hand or may be suitably weighted for the purpose. The valves in the drawing are placed in proper position for the operation of filtering.

The tank $x$ being filled with a dilute soluton of sulfuric acid, the valve $w$ is turned so as to drop into the funnel X the desired amount of solution at the rate of flow requisite for the character of water to be filtered. This water passes through the pipe C and the injector $j$, taking with it in its flow the dilute solution of sulfuric acid contained in the funnel X and its exit. The water thence passes through the valve $a$, the pipe D, the valve $b$, and the pipe H into the upper portion of the filtering-chamber A, then through the mixture of carbon and aluminium, the perforated screen T, the sand bed S, the perforated screen E, the chamber F at the bottom of the filter, and out through the pipe G to the source of storage for the filtered water.

In the apparatus as shown the valves and pipes are arranged so that the sand bed S and the bed B, composed of carbon and aluminium, can be washed either separately or together, as desired. In the latter case the valve $b$ is given a quarter-turn, the valve $e$ is kept closed, as shown, the valve $g$ is kept closed, as shown, the valve $a$ is given a half-turn, so as to communicate with the pipe G' instead of with the pipe D, as shown in the drawing, the valve $d$ is given a quarter-turn, thus admitting air to the chamber F, and the valve $c$ is given a quarter-turn, so as to communicate with the pipe G' instead of with the pipe G. The interior construction of these valves is shown at $a'$, $b'$, $c'$, $d'$, $e'$, and $g'$. The water enters through the pipe C, down through the pipe G', through the valve $c$, into the chamber F, where it is aerated by the air admitted through the pipe L and the valve $d$. It then passes through the screen E, up through the sand bed S, the perforated screen T, the bed B, the pipe H, the valve $b$, and out through the pipe I to the sewer.

If it is desired to wash the bed B only, the valve $a$ is given a half-turn, the valve $g$ is given a quarter-turn, the valve $c$ is given a quarter-turn, the valve $e$ is kept closed, as shown, the valve $b$ is given a quarter-turn, and the valve $d$ is kept closed, as shown. The water then passes through the pipe C, the valve $a$, the valve $g$, into the lower part of the filter A, then through the perforated screen T, the bed B, out through the pipe H, the valve $b$, and the pipe I.

If it is desired to wash the lower bed S only, the valve $a$ is given a half-turn, the valve $g$ is closed, as shown, the valve $c$ is given a quarter-turn, the valve $d$ is given a quarter-turn, the valve $e$ is given a quarter-turn, and the valve $b$ is given a half-turn. The water then enters through the pipe C, the valve $a$, the pipe G', the valve $c$, the chamber F, the sand bed S, and out through the valve $e$ and pipe P.

In the operations of washing of course it will not be necessary to allow the dilute solution of acid to be injected into the water.

I do not confine myself, however, to the use of sulfuric acid, because other equivalent acids may be used with beneficial effect so long as they are of a character not to give a color or an unpleasant taste to the effluent water and otherwise are electrically the equivalent of sulfuric acid; nor do I confine myself in this invention to the use of the dilute sulfuric-acid solution in connection with carbon and a metal which is electropositive to the carbon, for other substances than carbon may be used, provided there is electric action between them in the presence of the electrolyte constituted by the acidulated water.

What I claim, and desire to secure by Letters Patent, is—

1. An improvement in the art of purifying water which consists in (1) introducing into the water a dilute solution of sulfuric acid, and (2) passing the water through a filter-bed composed of hard carbon and a metal which is electropositive to the carbon, substantially as described.

2. An improvement in the art of purifying water which consists in (1) introducing into the water a dilute solution of sulfuric acid, and (2) passing the water through a filter-bed composed of hard carbon and a metal which is electropositive to the carbon and an inert granular material such as sand, substantially as described.

3. An improvement in the art of purifying water which consists in (1) introducing into water a dilute solution of sulfuric acid, and (2) passing the water through a filter-bed composed of hard carbon and aluminium, substantially as described.

4. An improvement in the art of purifying water which consists in (1) introducing into the water a dilute solution of sulfuric acid, and (2) passing the water through a filter-bed composed of hard carbon, aluminium and a granular inert material such as sand, substantially as described.

5. An improvement in the art of purifying water which consists in (1) introducing into the water a dilute solution of sulfuric acid, and (2) passing the water through a filter-bed composed of two substances which are relatively electropositive and electronegative to each other, substantially as described.

6. An improvement in the art of purifying water which consists in (1) introducing into the water a dilute solution of sulfuric acid, and (2) passing the water through a filter-bed composed of two substances which are relatively electropositive and electronegative to each other and an inert material such as sand, substantially as described.

ROBERT E. MILLIGAN.

Witnesses:
JAMES J. COSGROVE,
J. E. HINDON HYDE.